Oct. 8, 1963  T. A. BYLES  3,106,665
VOLTAGE REGULATOR FOR VEHICULAR ELECTRICAL SYSTEM
Original Filed Dec. 23, 1957

INVENTOR.
Theodore A. Byles
BY
Mueller & Aichele
Attys.

United States Patent Office 3,106,665
Patented Oct. 8, 1963

3,106,665
VOLTAGE REGULATOR FOR VEHICULAR ELECTRICAL SYSTEM
Theodore A. Byles, Villa Park, Ill., assignor to Motorola, Inc., Chicago, Ill., a corporation of Illinois
Original application Dec. 23, 1957, Ser. No. 704,421. Divided and this application Nov. 29, 1960, Ser. No. 72,473
3 Claims. (Cl. 317—100)

This invention relates to voltage and current regulators and more particularly to an electronic regulator of the type adapted to control the current and voltage of a generator in a vehicular electrical system. This application is a division of my copending application Serial No. 704,421, filed December 23, 1957, and now abandoned.

The present day regulator used in vehicles, such as automobiles, commonly employs electromechanical means to limit the current to a value which the generator can safely supply and to limit the voltage output of the generator to a value which will not damage the various devices connected to the system in the automobile. In this way, the storage battery usually included in electrical systems of this type can be charged and, for the most part, supplanted when the generator output is sufficient to energize various electrical items in the vehicle. Such prior art regulators have been troublesome in that calibration thereof may be unstable and the mechanically operated electrical contacts can fail to operate reliably under the varying conditions which are encountered during use of the vehicle. The electronic regulators known in the past have not been altogether suitable for the use in a vehicle electrical system where stability requirements are severe and where construction must be substantial for satisfactory usefulness.

Accordingly, it is an object of this invention to provide an electronic voltage regulator for an automobile electrical system which has improved stability and reliability over previously known regulators.

Another object is to provide an improved transistorized regulator for an automobile generator for charging the battery in the electrical system, which regulator requires no moving parts for limiting the current drawn from the generator to prevent overload thereof and for limiting the voltage output of the generator to prevent application of excess potentials to the automobile electrical accessories.

Another object of the invention is to provide an electronic regulator for an automobile electrical system which is of simplified and rugged construction.

Still another object of the invention is to provide a transistorized regulator which is of compact form and yet affords necessary heat dissipation under variable ambient temperature conditions.

A feature of the invention is the provision of transistor circuits which are interconnected upon a printed circuit panel board and enclosed in a two-piece housing.

Another feature is the provision of an improved voltage regulator having a heat conductive frame for cooling as well as mounting and protecting components of the device.

Further objects, features and the attending advantages of the invention will be apparent upon consideration of the following description when taken in conjunction with the accompanying drawings, in which.

In a particular form of the invention, a control transistor is adapted to be coupled to a control winding of a generator system for regulating the generator system output. The conduction of the control transistor is regulated by a transistor responsive to a certain voltage change and a transistor responsive to a certain current change. Control elements of the voltage responsive transistor are coupled to a voltage divider network connected to the output of the generator system and including a zener diode and a temperature sensitive resistor so that the voltage responsive transistor conducts when a given generator voltage is reached, corresponding to a break down potential of the zener diode, to decrease the conduction of the control transistor and limit the output voltage of the generator system. The voltage divider may include a ballast tube so that the control voltage limit is less sensitive to the voltage of the generator system. Control elements of the current responsive transistor are coupled to a voltage divider network having a further temperature sensitive resistor and a constant reference potential established by a ballast tube. The current responsive transistor is also controlled by a potential varying with load current so that sufficient increase of the current causes conduction of the current responsive transistor and decreased conduction of the control transistor, and thus the control winding current, to reduce generator system output. A printed circuit panel is used to support most of the components. Some components, however, are directly "heat sinked" to the mounting frame for the panel, for example, the control transistor. Thus, the frame can serve a mechanical function as well as a dual electrical function of cooling the components and providing an electrical connection to the unit.

Figure 1:
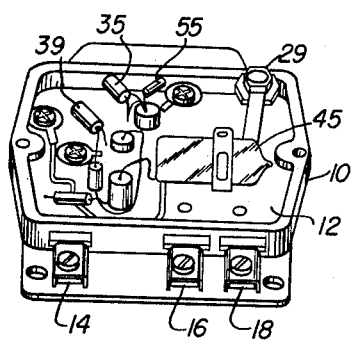
FIG. 1 is a perspective top view of a regulator with the cover removed and constructed in accordance with the present invention.
Figure 2:
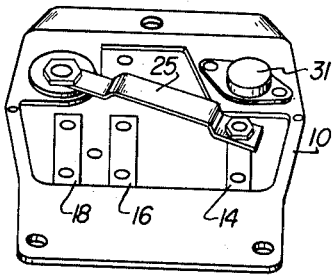
FIG. 2 is a perspective bottom view of the regulator of FIG. 1.
Figure 3:
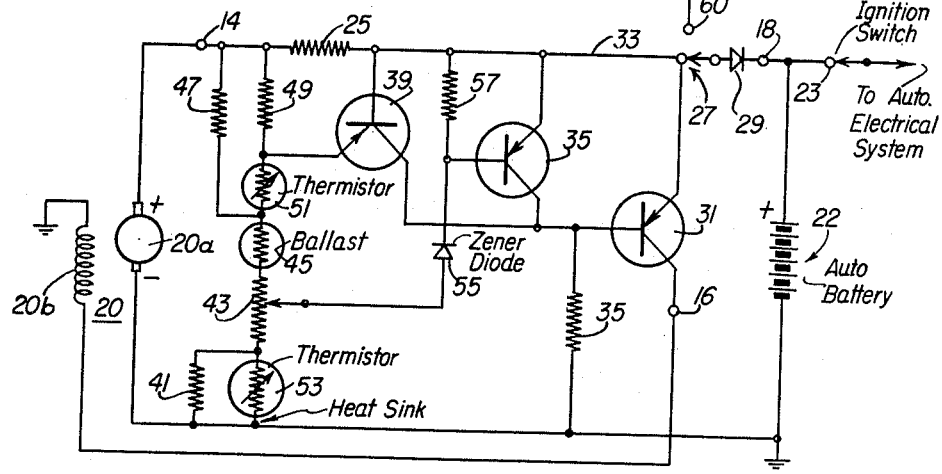
FIG. 3 is a schematic diagram of the regulator constructed in accordance with the invention.

The voltage and current regulator shown in FIGS. 1 and 2 includes a housing frame 10 supporting a printed circuit panel 12 which carries some of the circuit components identified in connection with the explanation of the circuit of FIG. 3. A suitable enclosing cover (not shown) may be secured to the frame 10 to enclose the components shown in FIG. 1. The components exposed from the bottom of frame 10 as shown in FIG. 2 are protected when the unit is mounted against a surface in the engine compartment of an automobile or other vehicle in which the device is used. Electrical connection to the device is made through the frame 10 which is a reference point or ground for the device and terminals 14, 16 and 18 which are respectively connected to the generator system output, or armature; the generator system control winding, or field; and the load to which the generator supplies power, or the battery which is charged by the generator system.

In the schematic diagram of FIG. 3 there is shown a direct current automobile generator 20, the armature 20a of which has a positive terminal connected to the terminal 14 and a negative terminal connected to ground, or the frame of the regulator. A field winding 20b of the generator is connected between ground and terminal 16 of the regulator. The output terminal 18 of the regulator is connected to the positive terminal of an automobile storage battery 22 and also through ignition switch 23 to the automobile electrical system. A negative terminal of battery 22 is grounded. Current is supplied from the generator 20 to charge the battery 22 or to energize the auto electrical system by conduction from terminal 14 through resistor 25 switch 27, which is normally closed, and diode 29 and terminal 18. Diode 29 is poled to prevent reverse conduction or discharge of the battery 22 into the regulator and generator system. The return current path is, of course, provided through ground.

In the regulator circuit, a power transistor 31 has its emitter connected to lead 33 which extends between resistor 25 and a terminal of switch 27. The base electrode of transistor 31 is connected to ground through resistor 35. The output electrode, or collector, of transistor 31 is connected to terminal 16 and the field 20b of the generator is series connected in the emitter-collector circuit of the transistor so that a change in the transistor output current will vary the energization of the field winding and thus control the output of the generator.

Transistor 35 is connected so that it will be conductive when a predetermined voltage limit is reached and when the generator system output voltage exceeds such limit, transistor 35 conducts to control transistor 31 in a way to reduce the field current to limit the generator output voltage. Transistor 39 is sensitive to the generator system output current conducted through lead 33 and between terminals 14 and 18, so that an increase beyond a given current level will cause a reduction in the output current of transistor 31 and thereby a reduction of the output of generator 20. The circuit construction and operation to accomplish these results will now be explained.

To provide the necessary biasing voltages for transistors 35 and 39, a voltage divider network is connected between terminal 14 and ground, with a further portion of the network being connected to lead 33. The network includes a resistor 41 connected between ground and one fixed terminal of a variable resistor 43, the other fixed terminal of resistor 43 being connected to a ballast tube 45. The ballast tube 45 is series connected with resistor 47 which is connected to terminal 14. A series combination of resistor 49 and thermistor 51 is connected across resistor 47 and a further thermistor 53 is connected across resistor 41. The movable arm of variable resistor 43 is connected to a zener or avalance type diode 55 which is series connected wtih resistor 57 to lead 33.

The ballast tube 45 is used to maintain a constant current in its series circuit throughout a variation of the generator system output voltage over which the regulator operates. Accordingly, reference potentials are available in the voltage divider system which are independent of variations in the supply voltage existing between terminal 14 and ground.

Transistor 35 is connected in a voltage limit responsive network with its emitter connected to lead 33, its base connected to the junction of diode 55 and resistor 57 and its collector connected to the base of transistor 31. Variable resistor 43 is adjusted to provide a bias on diode 55 such that this diode will reach its critical back bias voltage, or reverse breakdown voltage, when the voltage between lead 33 and ground has reached a predetermined maximum at which it is desired to limit the output of the system. At potentials of lead 33 below the desired maximum allowable voltage transistor 35 is biased to cutoff and when the maximum voltage is exceeded the diode 55 commences conduction in a reverse direction and the current flowing through resistor 57 establishes a bias on transistor 35 such that it conducts through resistor 35 thereby reducing the conduction of transistor 31 and reducing the energizing current in field winding 20b so that the generator output is reduced. The system then maintains a balance with a small control voltage existing across resistor 57.

It may be noted that if the collector current of transistor 35 tends to rise due to junction heating, this would cause a reduction in the generator output voltage thereby reducing the emitter bias on transistor 35 until equilibrium was reached. Accordingly, the voltage limiter circuit is self-compensating for temperature effects on the transistor 35.

In a particular application of the regulator it may be desirable to raise the maximum limit voltage of the system at lower temperatures. For example, in a nominal 14 volt automobile electrical system, it may be desired that the maximum allowable voltage output be 14 volts at temperatures in the neighborhood of 150° F. and a voltage of 15.8 in the region nearer 0° F. This is in accordance with the optimum charging voltages for some lead acid storage batteries used in automobiles. Thermistor 53 in parallel with resistor 41 is used to provide this effect. Thermistor 53 has a negative temperature coefficient so that at higher temperatures the voltage applied from the arm of variable resistor 43 to the zener diode is somewhat lower than it is at low temperatures. This temperature control voltage is effectively a bias which adds to the breakdown voltage of diode 55. Accordingly, the limiting voltage at which transistor 35 commences conduction is higher as temperature decreases and the regulator circuit therefore compensates for the internal resistance of the storage battery as it varies with temperature. It may also be noted that it is desirable to connect the ground side of thermistor 53 by means of an effective heat conduction contact with the frame of the regulator unit to prevent a runway condition because as thermistor 53 is heated through self-generated heat, this would otherwise have the tendency to increase the current through this thermistor and continue the heating process.

The current limiter transistor 39 has a base electrode connected to lead 33, and a collector electrode connected to the base of transistor 31 and an emitter electrode connected to the junction of thermistor 51 and resistor 49. Accordingly, transistor 39 is biased by the voltage across the combination of resistors 25 and 49. As previously explained ballast tube 45 maintains an essentially constant current through the voltage divider network so that the potential drop across resistor 49 does not vary with variation in the output voltage of generator 20. The components in the biasing voltage divider network, including resistor 47, resistor 49 and thermistor 51, together with resistor 25, provide a reverse emitter bias for transistor 39 so that it is biased below cutoff. However, the value of resistor 25 is selected so that as a predetermined current level is reached a potential drop is produced which causes conduction of transistor 39 through resistor 35 thereby controlling the power transistor 31 to cause the reduction in the current through field 20b and thus a reduction in the output of generator 20.

Transistor 39 may also be temperature sensitive and for any given desired conduction condition of this transistor the necessary bias may be a function of the temperature of the transistor. Accordingly, thermistor 51, having a negative temperature coefficient, in combination with resistor 49, which has a very small value compared to that of thermistor 51, provides a bias voltage for the emitter of transistor 39 which is a function of temperature to compensate for the change in conduction characteristics of the transistor.

In particular applications of the electronic current and voltage limiter of the present invention it may be desired that the regulated voltage be higher when the limiter commences operation than it is after 15 to 30 minutes of operation. It has been found that warm-up heating of the device in combination with the temperature compensating circuit elements described above are sufficient to cause a small decrease in the voltage at which limiter action takes place thus providing this desirable characteristic of the regulator system.

In a particular successful embodiment of the invention the circuit constants were as follows:

| | |
|---|---|
| Transistor 31 | 2N176. |
| Transistors 35, 39 | XN13. |
| Resistor 25 | .008 ohm. |
| Resistor 35 | 220 ohms. |
| Resistor 41 | 12 ohms. |
| Resistor 43 | 25 ohms. |
| Ballast tube 45 | DT583. |
| Resistor 47 | 3.3 ohms. |
| Resistor 49 | 1 ohm. |
| Thermistors 51, 53 | 40 ohms at 25° C. |
| Diode 55 | ZA12 (Hoffman Electronics). |
| Battery 22 | Nominally 12 volts. |

With the particular circuit constructed according to these specifications, current limiting could be successfully maintained at 30 amperes and voltage limiting could be maintained at 15.8 volts at 0° F. and at 14.5 volts at 150° F.

As a further refinement of the circuit, switch 27 includes a contact 60 so that operation of the switch to establish contact 60 will connect the secondary of transformer 65 between the diode 29 and ground. The primary of transformer 65 may include a standard line cord plug 67 so that transformer 65 can supply the proper voltage from the power lines for rectification by diode 29 and charging of battery 22. Obviously other methods of connecting transformer 65 to the system may be employed. In this way it is possible to use the cutout diode 29 as part of a simple battery charging circuit when a power outlet is available.

Accordingly, this invention provides a rugged and yet simple regulator suitable for use in a vehicle electrical system wherein a generator supplies charging power for a storage battery used in the system. The current and voltage limiter action of the system described provides change in output characteristics with temperature as may be required by a storage battery and successfully maintains desired limit voltage and current values during variation in the ambient temperature of the regulator unit thereby compensating for changes in the characteristics of the components used in the system.

I claim:

1. Electronic regulator apparatus for a vehicle including in combination, a heat conducting frame adapted to provide a heat sink and mounting means for said apparatus, a circuit panel board secured to said frame and having a plurality of conductors and components carried thereby, and a transistor secured to said frame and including electrical connections to said conductors and components on said panel board, at least one of said transistor and components having a heat conductive relationship to said frame for temperature stabilization purposes.

2. A voltage regulator for a vehicular electrical system, including in combination, a heat conducting base frame adapted to provide a heat sink for said regulator and a reference electrical conductor therefor, a printed circuit panel board secured to one side of said frame and having a plurality of conductors and electrical components fixed thereto, a power transistor mounted on the other side of said base frame, said conductors, components and transistor forming a voltage regulator circuit with a portion of said regulator circuit in electrical and heat conducting relation with said base frame.

3. A voltage regulator for a vehicular electrical system, including in combination, a housing having a heat conducting base frame and adapted to receive a cover over a front side thereof, said base frame being adapted to provide a heat sink for said regulator and a reference ground conductor, a circuit panel secured to said front side of said frame and carrying interconnected regulator components thereon, a power transistor mounted on the back side of said base frame and a temperature responsive resistor operative in said regulator to temperature compensate the same, said resistor being mounted in heat conduction relationship with said base frame.

References Cited in the file of this patent

UNITED STATES PATENTS

| | | |
|---|---|---|
| 2,418,895 | Middleton | Apr. 15, 1947 |
| 2,945,989 | Vogel et al. | July 19, 1960 |